US012443775B2

(12) United States Patent
Lu

(10) Patent No.: US 12,443,775 B2
(45) Date of Patent: Oct. 14, 2025

(54) DETERMINING MATURITY OF PALEOZOIC UNCONVENTIONAL SHALE GAS

(71) Applicant: SAUDI ARABIAN OIL COMPANY, Dhahran (SA)

(72) Inventor: Feng Hu Lu, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 1017 days.

(21) Appl. No.: 17/453,204

(22) Filed: Nov. 2, 2021

(65) Prior Publication Data

US 2023/0138017 A1 May 4, 2023

(51) Int. Cl.
*G06F 30/20* (2020.01)
*E21B 49/08* (2006.01)

(52) U.S. Cl.
CPC .............. *G06F 30/20* (2020.01); *E21B 49/08* (2013.01); *E21B 2200/20* (2020.05)

(58) Field of Classification Search
CPC ....... G06F 30/20; E21B 49/08; E21B 2200/20
USPC .......................................................... 703/10
See application file for complete search history.

(56) References Cited

U.S. PATENT DOCUMENTS

| 7,529,626 | B1 * | 5/2009 | Ellis | G01N 33/2823 |
| | | | | 702/9 |
| 10,823,716 | B2 * | 11/2020 | Lu | G01N 33/0047 |
| 10,983,246 | B2 * | 4/2021 | Mosse | G01V 3/32 |
| 11,499,957 | B1 * | 11/2022 | Wang | G06F 30/28 |
| 11,815,503 | B2 * | 11/2023 | Lu | G01N 33/246 |

(Continued)

FOREIGN PATENT DOCUMENTS

| CN | 104295291 A | 1/2015 |
| CN | 104849365 A | 8/2015 |

(Continued)

OTHER PUBLICATIONS

Hao et al. ("Cause of shale gas geochemical anomalies and mechanisms for gas enrichment and depletion in high maturity shales", Marine and Petroleum Geology 44 (2013) 1-12). (Year: 2013).*

(Continued)

*Primary Examiner* — Iftekhar A Khan
(74) *Attorney, Agent, or Firm* — Osha Bergman Watanabe & Burton LLP

(57) ABSTRACT

A method of fabricating and utilizing an unconventional reservoir maturity chart is provided. A historical dataset for a Paleozoic or a pre-Paleozoic shale or sandstone unconventional reservoir is utilized to obtain carbon isotopic ratio values for $\delta 13C_1$, $\delta 13C_2$, and vitrinite reflectance equivalents (VRE). Such data is utilized to plot several maturity shapes based upon VRE values, where several of the maturity shapes have a maturity shape boundary defined by the relationship $\delta^{13}C_1 = \delta^{13}C_2$. The method for utilizing the unconventional reservoir maturity chart may include determining a maturity level for the hydrocarbon gas sample based upon a relative position of the plotted data point versus a first maturity shape, a second maturity shape, a third maturity shape, and a fourth maturity shape. The method may also permit determining a production plan for the unconventional reservoir associated with the hydrocarbon gas sample.

13 Claims, 6 Drawing Sheets

(56) References Cited

U.S. PATENT DOCUMENTS

| | | | | |
|---|---|---|---|---|
| 2004/0014223 | A1* | 1/2004 | Audibert | H01J 49/04 436/30 |
| 2010/0326651 | A1* | 12/2010 | Pietrobon | E21B 43/14 166/250.01 |
| 2014/0250999 | A1* | 9/2014 | Lawson | E21B 49/02 73/152.23 |
| 2015/0198577 | A1* | 7/2015 | Williams | G01N 33/24 250/282 |
| 2016/0222781 | A1* | 8/2016 | Lawson | E21B 47/07 |
| 2016/0259087 | A1* | 9/2016 | Siddiqui | E21B 43/34 |
| 2017/0074094 | A1* | 3/2017 | Rowe | E21B 49/005 |
| 2017/0211102 | A1* | 7/2017 | Giver | C12N 1/20 |
| 2017/0226851 | A1* | 8/2017 | Hakami | G01N 33/2823 |
| 2018/0223657 | A1* | 8/2018 | Zuo | E21B 49/082 |
| 2018/0245464 | A1* | 8/2018 | Formolo | G01N 33/241 |
| 2019/0212314 | A1* | 7/2019 | Lu | G01N 33/225 |
| 2019/0219558 | A1* | 7/2019 | Villar De Andrade E Silva | G01N 33/2823 |
| 2020/0408090 | A1* | 12/2020 | Kadayam Viswanathan | G01N 24/08 |
| 2021/0003727 | A1* | 1/2021 | Zhu | E21B 43/26 |
| 2023/0054795 | A1* | 2/2023 | Altowairqi | G01V 1/306 |
| 2023/0056738 | A1* | 2/2023 | Wang | G01N 25/22 |

FOREIGN PATENT DOCUMENTS

| | | |
|---|---|---|
| CN | 109577974 A | 4/2019 |
| FR | 2956741 A1 | 8/2011 |
| WO | 2007008932 A2 | 1/2007 |
| WO | 2020252249 A1 | 12/2020 |

OTHER PUBLICATIONS

Cesar at al. (Stable carbon isotope systematics of methane, ethane and propane from low-permeability hydrocarbon reservoirs, Chemical Geology ,(2020), pp. 1-17) (Year: 2020).*

Alan James (Correlation of Reservoired Gases Using the Carbon Isotopic Compositions of Wet Gas Components1, the American Association of Petroleum Geolog1sts Bulletin (Sep. 1990). p. 1441-1458) (Year: 1990).*

Burruss, R.C., et al., "Carbon and hydrogen isotopic reversals in deep basin gas: Evidence for limits to the stability of hydrocarbons", Organic Geochemistry 41, pp. 1285-1296, 2010 (12 pages).

Bustin, R. M., et al., "Petrology and preliminary organic geochemistry of conodonts: implications for analyses of organic maturation", International Journal of Coal Geology, vol. 21, pp. 261-282, 1992 (22 pages).

Chatellier, Jean-Yves, et al., "Overpressure in Shale Gas: When Geochemistry and Reservoir Engineering Data Meet and Agree", AAPG Memoir 103, pp. 45-69, 2011 (27 pages).

Chen, Zhucheng, et al., "A shale gas resource potential assessment of Devonian Horn River strata using a well-performance method1", Canadian J. Earth Science 53, pp. 156-167, 2016 (12 pages).

Dai, Jinxing, et al., "Origins of partially reversed alkane 13C values for biogenic gases in China", Organic Geochemistry 35, pp. 405-411, 2004 (7 pages).

Dai, Jinxing, et al., "Geochemistry of the extremely high thermal maturity Longmaxi shale gas, southern Sichuan Basin", Organic Geochemistry 74, pp. 3-12, 2014 (10 pages).

Eia, "Technically Recoverable Shale Oil and Shale Gas Resources: Canada", U.S. Energy Information Administration, 2015 (66 pages).

Stahl, Wolfgang, Isotopengeochemie gasförmiger Kohlenwasserstoffe—Ein Beitrag zur Prospektion von Erdöl und Erdgas—(Kurzfassung), 1988 (4 pages).

Hao, Fang, et al., "Cause of shale gas geochemical anomalies and mechanisms for gas enrichment and depletion in high-maturity shales", Marine and Petroleum Geology 44, pp. 1-12, 2013 (12 pages).

Houseknecht, David W., et al., "Upper Devonian-Mississippian stratigraphic framework of the Arkoma Basin and distribution of potential source-rock facies in the Woodford-Chattanooga and Fayetteville-Caney shale-gas systems", Americal Association of Petroleum Geologists, AAPG Bulletin, vol. 98, No. 9, pp. 1739-1759, Sep. 2014 (21 pages).

Lüning, S., et al., "Lower Silurian 'hot shales' in North Africa and Arabia: regional distribution and depositional model", Earth-Science Reviews 49, pp. 121-200, 2000 (80 pages).

Tilley, Barbara, et al., "Gas isotope reversals in fractured gas reservoirs of the western Canadian Foothills: Mature shale gases in disguise", The American Association of Petroleum Geologists, AAPG Bulletin, vol. 95, No. 8, pp. 1399-1422, Aug. 2011 (24 pages).

Tilley, Barbara, et al., "Isotope reversals and universal stages and trends of gas maturation in sealed, self-contained petroleum systems", Chemical Geology 339, pp. 194-204, 2013 (11 pages).

Xia, Xinyu, et al., "Isotopic reversals with respect to maturity trends due to mixing of primary and secondary products in source rocks", Chemical Geology 339, pp. 205-212, 2013 (8 pages).

Yang, S., et al., "On the primary and secondary petroleum generating characteristics of the Bowland Shale, northern England", Journal of the Geological Society, pp. 292-305, 2016 (14 pages).

Zumberge, John, et al., "Isotopic reversal ('rollover') in shale gases produced from the Mississippian Barnett and Fayetteville formations", Marine and Petroleum Geology 31, pp. 43-52, 2012 (10 pages).

Ratchford, M. Ed, et al., "Organic Geochemistry and Thermal Maturation Analysis Within the Fayetteville Shale Study Area—Eastern Arkoma Basin and Mississippi Embayment Regions, Arkansas", Arkansas Geological Survey Information Circular 37, 2006 (223 pages).

Repetski, John E., et al., "Thermal Maturity Patterns (CAI and %Ro) in Upper Ordovician and Devonian Rocks of the Appalachian Basin: A Major Revision of USGS Map I-917-E Using New Subsurface Collections", US Geological Survey Scientific Investigations Map 3006, 2008 (41 pages).

\* cited by examiner

DETERMINING MATURITY OF PALEOZOIC UNCONVENTIONAL SHALE GAS

BACKGROUND

Thermal maturity is a parameter utilized to assess the potential of natural gas from an unconventional source. The traditional technique to determine maturity is to use optical microscopy to measure reflected light from particles of vitrinite (that is, woody debris). This measurement is often referred to as vitrinite reflectance ($VR_O$), which is expressed in percentage (%) reflectance.

Carbon isotope technology has been applied to calculate thermal maturity of natural gas based on a linear relationship between maturity via vitrinite reflectance and carbon isotope values of methane (also ethane and propane). Faber proposed such linear relationships in "Zur Isotopengeochemie gasförmiger Kohlenwasserstoffe"; Erdöl Ergas Kohle, vol. 103(5), pgs. 210-18 (1987), the contents of which are incorporated by reference in its entirety. Others in the art have continued to propose similar linear relationships between vitrinite reflectance and carbon isotope values.

SUMMARY

In one or more instances, a method of fabricating an unconventional reservoir maturity chart may include a step of providing a historical dataset for a Paleozoic or a pre-Paleozoic shale or sandstone unconventional reservoir. In such instances, the historical dataset may include information associated with the Paleozoic or a pre-Paleozoic shale or sandstone unconventional reservoir. The information is such that associated carbon isotopic ratio values of $\delta^{13}C_1$ and $\delta^{13}C_2$ and vitrinite reflectance equivalents (VRE) value may be obtained. The method may include plotting the carbon isotopic ratios values of $\delta^{13}C_1$ and $\delta^{13}C_2$ on an unconventional reservoir maturity chart. The carbon isotopic ratios values of $\delta^{13}C_1$ and $\delta^{13}C_2$ are in units of parts per thousand (‰) Vienna Pee Dee Belemnite (VPDB). Plotting a first maturity shape having an enclosed first boundary on the unconventional reservoir maturity chart such that a substantial number of the historical data points having a VRE value in a range of from about 0.5 to 1.5% reflectance equivalents are located within a first maturity area may be part of the method. The first maturity area may be defined by the first boundary of the first maturity shape. The method may include plotting a second maturity shape having an enclosed second boundary on the unconventional reservoir maturity chart such that a substantial number of the historical data points having a VRE value in a range of from about 1.5 to 2.0% reflectance equivalents are located within a second maturity area. The second maturity area is defined by the second boundary of the second maturity shape. A lower portion of the second boundary is defined by the relationship $\delta^{13}C_1=\delta^{13}C_2$. Plotting a plotting a third maturity shape having an enclosed third boundary on the unconventional reservoir maturity chart such that a substantial number of the historical data points having a VRE value in a range of from about 2.0 to about 3.5% reflectance equivalents are located within a third maturity area may be part of the method. The third maturity area is defined by the third boundary of the third maturity shape. An upper portion of the third boundary is defined by the relationship $\delta^{13}C_1=\delta^{13}C_2$. Plotting a fourth maturity shape having an enclosed fourth boundary on the unconventional reservoir maturity chart such that a substantial number of the historical data points having a VRE value in a range of from about 3.5 to 5.0% reflectance equivalents are located within a fourth maturity area may be part of the method. The fourth maturity area is defined by the fourth boundary of the fourth maturity shape. An upper portion of the fourth boundary is defined by the relationship $\delta^{13}C_1=\delta^{13}C_2$.

In one or more instances, a method of utilizing the unconventional reservoir maturity chart is provided. An unconventional reservoir maturity chart, such as a chart as previously described, may be provided. The method may also include providing carbon isotopic ratio values of $\delta^{13}C_1$ and $\delta^{13}C_2$ for a hydrocarbon gas sample. The hydrocarbon gas sample may be associated with a Paleozoic or pre-Paleozoic sandstone or shale unconventional reservoir. The method may include the step of plotting a data point on the unconventional reservoir maturity chart. The data point may be associated with the carbon isotopic ratio values of $\delta^{13}C_1$ and $\delta^{13}C_2$ for the hydrocarbon gas sample. Determining a maturity level for the hydrocarbon gas sample based upon a relative position of the plotted data point versus the first maturity shape, the second maturity shape, the third maturity shape, and the fourth maturity shape on the unconventional reservoir maturity chart may be part of the method. The method may include determining a production plan for the reservoir associated with the hydrocarbon gas sample.

Other aspects of the disclosure will be apparent from the following Detailed Description and the appended Claims.

BRIEF DESCRIPTION OF DRAWINGS

Other aspects and advantages of this disclosure will be apparent from the following description made with reference to the accompanying drawings and the appended claims.

DETAILED DESCRIPTION

Figure 1:
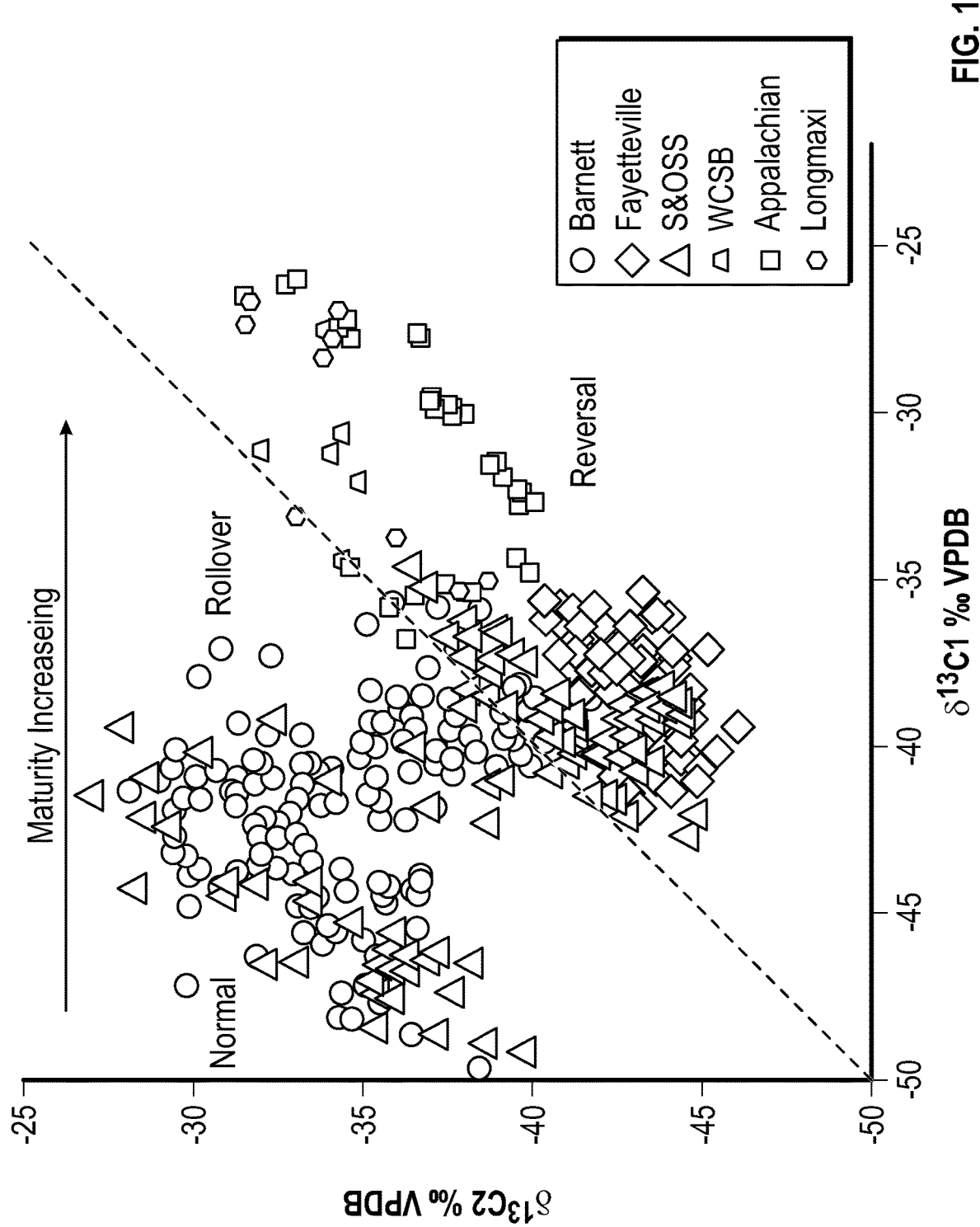
FIG. 1 is a plot of associated historical data points for $\delta^{13}C_1$ versus $\delta^{13}C_2$ values for several Paleozoic and pre-Paleozoic reservoirs.

Specific embodiments of the disclosure will now be described in detail with reference to the accompanying figures. Like elements in the various figures are denoted by like reference numerals for consistency.

In the following Detailed Description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

One of the problems with analyzing Paleozoic and pre-Paleozoic sediments is that there are rarely any particles of vitrinite present in the sediment. Because of this, it is difficult if not impossible to derive the aforementioned isotope concentration values from the mathematical relationships developed by Faber and others.

Another problem is that vitrinite reflectance ($VR_0$), which is typically a measure of maturity of an unconventional formation, is normally applied in rocks younger than that of the Devonian Era. Vitrinite is absent in older materials, such as early Paleozoic and Pre-Cambrian periods. In older rocks, a substitute value called vitrinite reflectance equivalents (VRE) is utilized, which exploits the presence of graptolites, chitinozoans, scolecodonts, and bitumens.

Another problem is that as maturity increases, different origin material crack to form different combinations of unconventional gas products, including isotope combinations. Kerogen dominates the gas production in young unconventional formations. As the unconventional formation matures, crude oil that has formed as a product of the kerogen cracking process begins to crack itself and then dominates unconventional gas production. Even though kerogen cracking continues, the cracking and reduction of crude oil in gas dominates this phase. After most of the crude oil has cracked, the cracking of wet gas components begins to dominate the production of unconventional gas, even though kerogen and crude oil still contribute. Finally, in overly mature reservoirs, effectively all of the kerogen, crude oil, and wet gas has cracked into dry gas components; residual materials and inorganics contribute most to dry gas and even hydrogen production. As natural gas production transitions from kerogen to crude oil to wet gas to residual products, the $^{13}C$ carbon isotopes in methane ($C_1$), ethane ($C_2$), and propane ($C_3$) normally increase in amount if not in concentration. After the crude oil has essentially finished cracking, however, the ethane and propane (the "wet gas" components in natural gas) start to become depleted; the natural gas begins to "dry out". This not well-appreciated behavior occurs in Paleozoic unconventional tight shale and sandstone formations as they mature.

This pattern of unconventional formation maturation of hydrocarbons from kerogen-based gas generation, the cracking of crude oil, then wet gas, residual organic solids, and even dry gas not only affects the detected concentration of "normal" natural gases ($^{12}C$ isotopes) but also the $^{13}C$ isotopes of these gases as well. Although not wanting to be bound by theory, the ratio of the carbon isotopes of a gas vary as some unconventional hydrocarbon-bearing formations, especially those that are of the Paleozoic and pre-Paleozoic era and those that are comprised of shale and sandstone gases, maturates.

FIG. 1 is a plot of associated historical data points for $\delta^{13}C_1$ versus $\delta^{13}C_2$ values for several Paleozoic and pre-Paleozoic reservoirs. In FIG. 1, six sets of historical data are provided from six sets of unconventional Paleozoic and pre-Paleozoic reservoirs. When comparing $\delta^{13}C_1$ versus $\delta^{13}C_2$ as maturity of the formation increases, what will be referred to in this application as a "lazy Z" pattern graphically emerges. There appears to be a "normal" period where the relationship between $\delta^{13}C_1$ and $\delta^{13}C_2$ are positively correlated. If isotopic information is available for methane, ethane and propane for an unconventional reservoir at this point in its development cycle, one may see the isotope ratios among those three gases to have a relationship something like this: $\delta^{13}C_1 < \delta^{13}C_2 < \delta^{13}C_3$. The normal period is the period where the equations in the Faber reference (see Background) tend to work well.

However, this normal period appears to end at about a VRE value of 1.5% reflectance for the aforementioned Paleozoic and pre-Paleozoic formations. The period after 1.5% VRE is termed the "rollover" period where $\delta^{13}C_1$ and $\delta^{13}C_2$ are negatively correlated, that is, $\delta^{13}C_1$ increases as $\delta^{13}C_2$ decreases. Finally, there appears to be a "reversed" period where $\delta^{13}C_1$ and $\delta^{13}C_2$ are once again positively correlated but the relationship of $\delta^{13}C_1$ and $\delta^{13}C_2$ is inverted, that is, $\delta^{13}C_1 < \delta^{13}C_2$. Eventually, the isotope relationship between $\delta^{13}C_1$, $\delta^{13}C_2$, and $\delta^{13}C_3$ changes in this period and the relationship complete inverts compared to the relationship of the three isotopes in the "normal" period, that is, $\delta^{13}C_1 > \delta^{13}C_2 > \delta^{13}C_3$. Because of the changes in isotope concentrations due to non-kerogen gas sources contributing to the formation of "new" natural gas components, including $^{13}C$ gases, the conventional linear relationships of Faber between isotope ratio and VRE do not appear to work in these "rollover" and "reversed" periods of natural gas creation. A new appreciation of the relationships as unconventional formations mature may be required.

There is a need to provide for a simple, quick, and easy resource for those planning for the exploitation of and production from an unconventional resource, especially a resource dating from the Paleozoic and pre-Paleozoic era that is sandstone or shale-based. A method that will allow planners and designers to utilize easy-to-obtain carbon isotope ratio information from a gas sample associated with a new unconventional reservoir to quickly assess its maturity and then make proper decisions on exploiting (or not) the resource and what subsurface and surface systems and structures are needed. Such a method would not require extensive geochemical analysis of the formation. The results would be based upon a solid foundation of historical information of like reservoirs to provide enough confidence to permit general planning of program exploitation, production modeling, construction and systems design. More involved yet longer-term analytical tools may "hone in" on a precise answer that is already reasonably close to the one provided by the embodiment methods.

The fabrication of an unconventional reservoir maturity chart presented utilizes historical isotope and chemical data from unconventional pre-Paleozoic and Paleozoic shale and sandstone formations to create a chart containing maturity shapes. The chart is based upon the relationship between relative isotopic ratio values of methane versus ethane. Each maturity shape represents limited areas within the chart where historical gas samples have provided points corresponding to a particular range of maturity as measured by vitrinite reflectance equivalents. The four maturity shapes developed by using historical unconventional pre-Paleozoic and Paleozoic gas information covers a maturity range having vitrinite reflectance equivalents in a range of about 0.5% to 5.0%.

Once provided, the unconventional reservoir maturity chart is easy-to-use and does not require a person that does not have ordinary skills in the art to classify a new unconventional reservoir by utilizing or waiting for someone else to utilize vitrinite reflectance information. Rather, from an easy-to-obtain formation gas sample of only $\delta^{13}C_1$ and $\delta^{13}C_2$ information, a preliminary yet accurate of determination of the maturity of a new unconventional Paleozoic or pre-Paleozoic age sandstone and shale unconventional reservoir may be made. After the determination, significant business and management decisions may be made for planning and development (or not) of an unconventional hydrocarbon-bearing formation, may be initiated. This saves time and resources.

The product unconventional reservoir maturity chart is easy to revise and update. Upon receiving the vitrinite reflectance equivalents percentage data, the chart may be updated by those that maintain it. The addition of an increased amount of "live" data only further improves the accuracy of the maturity ranges of the chart as an empirically based model.

The product unconventional reservoir chart also provides a side benefit when vitrinite reflectance equivalents percentage data is available. If the sample does not correlate with the unconventional reservoir maturity chart, then sample error or gas from multiple sources may be involved that confound the data. Each may require additional investigation and may provide insight into the configuration of the unconventional reservoir. The chart acts as a "check" on the accuracy of the laboratory-provided data.

The aforementioned unconventional reservoir maturity chart is only useful for characterizing gas samples associated with Paleozoic and pre-Paleozoic shale and sandstone unconventional reservoirs. Younger sandstone and shale unconventional reservoirs appear to have different isotope ratio patterns as they mature; therefore, they do not produce the same patterns of isotopic ratios as pre-Paleozoic and Paleozoic era formations do.

Figure 2:
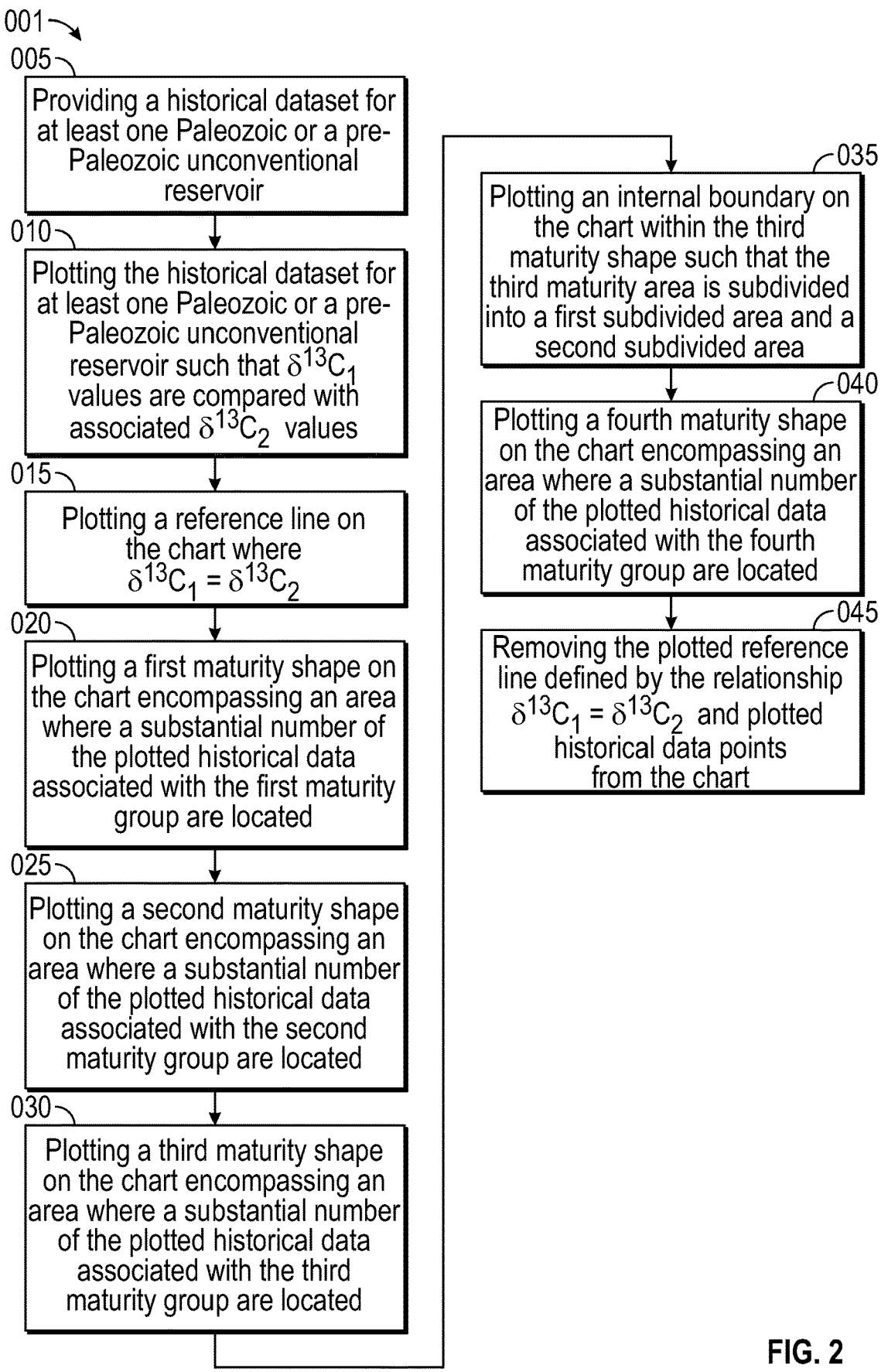
FIG. 2 is a flowchart that illustrates a method of fabricating an unconventional reservoir maturity chart in accordance with one or more embodiments.

A method of fabricating an unconventional reservoir maturity chart is provided in one or more embodiments. FIG. 2 is a flowchart that illustrates a method of fabricating an unconventional reservoir maturity chart in accordance with one or more embodiments.

In FIG. 2, method 200 includes step 005 for providing a historical dataset for at least one Paleozoic or a pre-Paleozoic unconventional reservoir. In one or more embodiments, a historical dataset for a Paleozoic or a pre-Paleozoic unconventional reservoir is provided. The historical dataset is derived by one or more hydrocarbon gas and formation samples from a Paleozoic or a pre-Paleozoic unconventional shale or sandstone reservoir. The historical dataset provides compositional, isotope, and vitrinite reflectance equivalents data from analyzed hydrocarbon gas and formation samples associated with a Paleozoic or a pre-Paleozoic unconventional shale or sandstone reservoir.

From such a historical dataset, associated values of $\delta^{13}C_1$, $\delta^{13}C_2$, and VRE may be obtained. In one or more instances, the historical dataset directly provides carbon isotopic values, such as $\delta^{13}C_1$, $\delta^{13}C_2$, and optionally $\delta^{13}C_3$. In one or more instances, the historical dataset provides data that permits one of ordinary skill in the art to derive such isotopic values, such as $\delta^{13}C_1$, $\delta^{13}C_2$, and optionally $\delta^{13}C_3$. It is noted that some historical datasets do not contain information that permits the derivation of $\delta^{13}C_3$ values. $\delta^{13}C_3$ values are not required in all embodiments of the method; however, knowledge of $\delta^{13}C_3$ value for a given formation has merit.

The historical dataset may provide information that permits one of ordinary skill in the art to determine the carbon isotopic values for a Paleozoic or a pre-Paleozoic unconventional reservoir. This assumes the historical dataset does not provide one or more isotopic values desired for use in the embodiment method. To do so, the identification of isotopes of carbon for one or more hydrocarbons (for example, methane, ethane, or propane) for a historical gas sample is made. A determination of the concentration of $^{13}C$ to $^{12}C$ isotopes for an individual chemical species of a sample relative to the concentration of those isotopes in a standard, such as Vienna Pee Dee Belemnite, is based, at least in part, on the following equation:

$$\delta^{13}C = \left( \frac{\left(\frac{^{13}C}{^{12}C}\right)_{sample}}{\left(\frac{^{13}C}{^{12}C}\right)_{standard}} - 1 \right) * 1000\% \quad \text{(Equation 1)}$$

where $\delta^{13}C$ values are in units of ‰ (parts per thousand or "mil") VPDB (Vienna Pee Dee Belemnite), which is a standard reference utilized in reporting carbon isotopic ratios. Values for any or all of $\delta^{13}C_1$, $\delta^{13}C_2$, and optionally $\delta^{13}C_3$ may be made assuming the appropriate information is present in the historical dataset.

In one or more embodiments, the historical dataset directly provides vitrinite reflectance equivalents (VRE) values associated with the particular $\delta^{13}C_1$, $\delta^{13}C_2$, and optionally $\delta^{13}C_3$ values. In one or more embodiments instances, the historical dataset provides data that permits one of ordinary skill in the art to derive such associated VRE values.

A provided historical dataset in one or more embodiments contains information from hydrocarbon-bearing formations that are considered unconventional in nature. "Unconventional" reservoirs have a variety of structures, including, but not limited to, coal beds, tight shale, and bitumen sands, but typically unconventional formations have one thing in common: the organic-rich source material that generates hydrocarbons at the condition of the formation is present with the generated hydrocarbons, that is, the hydrocarbons have not migrated. The produced hydrocarbons and the organic-rich source material are still both in the "source rock" in which the organic-rich material resides and the hydrocarbons derive. The hydrocarbon fluids that are potentially recoverable are not only co-located with their organic-rich source material but are also exposed to the conditions from which they were originally derived, that is, conditions where organic matter was cracked. As such, in later maturity unconventional formations, the hydrocarbons found may range from crude oil to overmature gas, and may contain fractions of condensate, wet gas, dry gas, and kerogen residual products.

The formation material associated with the historical dataset for a Paleozoic or a pre-Paleozoic unconventional reservoir may be substantially comprised of shale or sandstone.

In one or more embodiments, the provided historical dataset includes data for an unconventional reservoir that formed either during the Paleozoic era (about 541 to 252 million years ago) or before the Paleozoic era ("pre-Paleozoic era"), such as the Proterozoic era. One or more embodiment methods do not utilize historical data that are associated with unconventional reservoirs that may have formed after the Paleozoic era, such as the Mesozoic or Cenozoic eras. Although not wanting to be bound by theory, as previously provided isotope values and data from "younger" unconventional reservoirs tend to not have similar $\delta^{13}C$ value relationships as unconventional reservoirs of the Paleozoic and pre-Paleozoic eras. Therefore, including historical isotopic and VRE and $VR_0$ data from unconventional reservoirs that potentially formed during the Mesozoic or Cenozoic eras may confound the analysis of the isotopic association provided by the historical data associated with unconventional reservoirs of the Paleozoic and pre-Paleozoic eras and render the unconventional reservoir maturity chart non-useful.

In FIG. 2, method 200 provides step 010 that includes plotting the historical dataset for at least one Paleozoic or a pre-Paleozoic unconventional reservoir such that $\delta^{13}C_1$ values are compared with associated $\delta^{13}C_2$ values. In one or more embodiments, the values of $\delta^{13}C_1$ and $\delta^{13}C_2$ associated with the historical dataset are plotted on a chart.

Figure 3A:
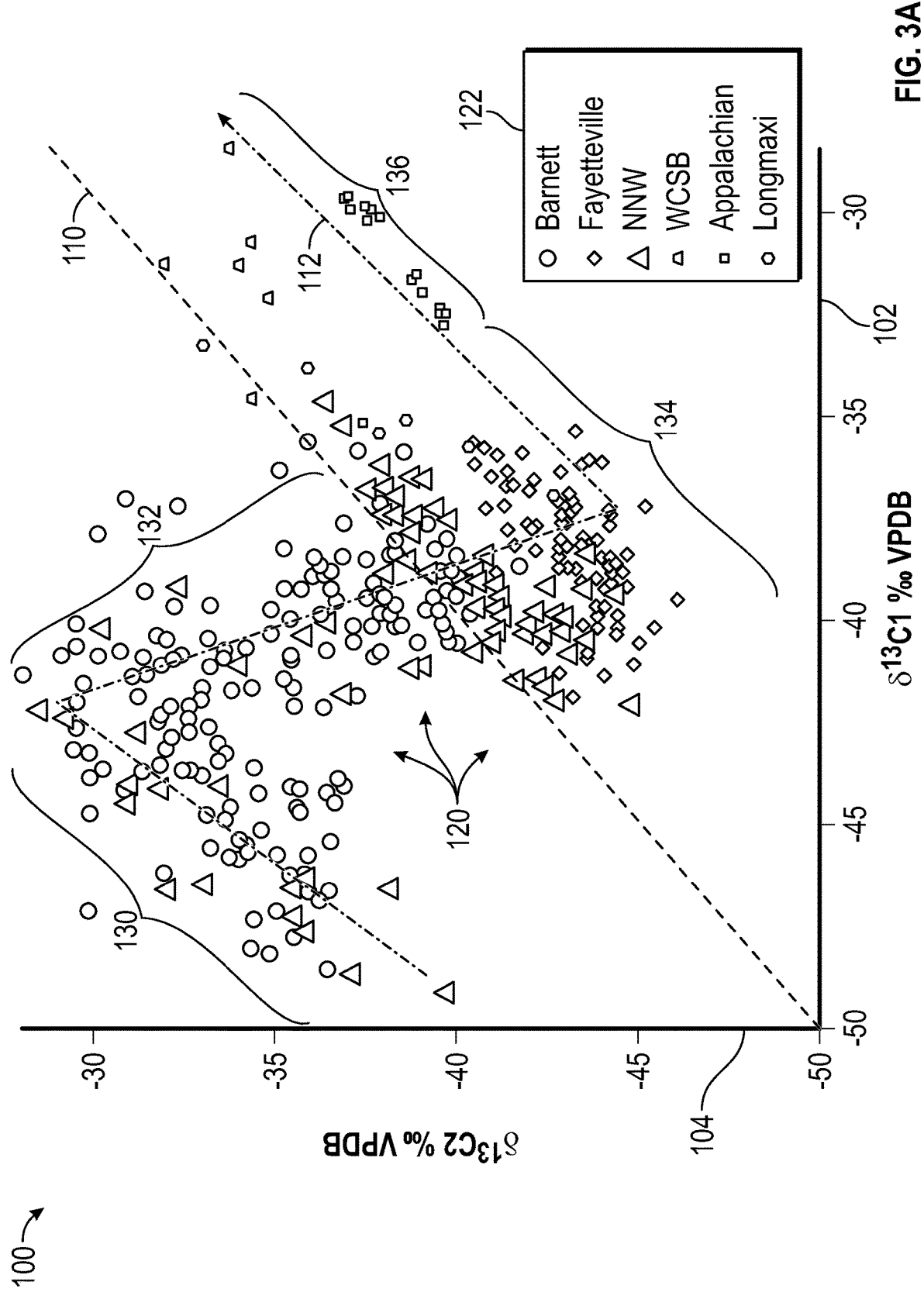
FIG. 3A is a plot of associated historical data points for $\delta^{13}C_1$ versus $\delta^{13}C_2$ values for several Paleozoic and pre-Paleozoic reservoirs with maturity groups indicated according to one or more embodiments.

FIG. 3A is a plot of associated historical data points for $\delta^{13}C_1$ versus $\delta^{13}C_2$ values for several Paleozoic and pre-Paleozoic reservoirs with maturity groups indicated according to one or more embodiments. FIG. 3A has a Cartesian coordinate chart (100) configuration with an X-axis (102) of $\delta^{13}C_1$ values. The Y-axis (104) of $\delta^{13}C_2$ values with similar units is also presented. Both axes are in the negative value range due to comparison with the VPDB standard, which has a greater value. For the chart, the values ascend away from the intersection of the axes (left to right and bottom to top on FIG. 3A).

FIG. 3A shows on chart 100 a number of plotted historical data points 120. The various historical data points are from the provided dataset for one or more Paleozoic and pre-Paleozoic unconventional sandstone and shale reservoirs are based upon their sampled associated $\delta^{13}C_1$ and $\delta^{13}C_2$ values. In the plotted data shown in FIG. 3A, there are six different historical data sets provided (as seen in legend 122) that contribute their associated values of $\delta^{13}C_1$ and $\delta^{13}C_2$ such that they can be plotted.

As previously described in the plotting of the historical data points into chart, there is also another association of the historical data in this configuration that may be made: the grouping of the plotted data associated with certain ranges of VRE values. In the chart shown in FIG. 3A, associated VRE values may be provided along with the plotted historical data points. VRE values reflect the different phases of maturation of the unconventional formation based upon vitrinite reflectance equivalents percentage. Optionally, each historical data point may indicate, such as through color, shape, or a numerical value, the VRE value associated with that historical data point.

In observing historical data points (120) in chart (110) of FIG. 3A, a general "lazy Z" pattern presents itself, as exhibited by dashed reference line (112). Dashed reference line 112 is provided in this instance merely for visualization purposes; it is not part of the analysis of the historical data. More regarding the comparison of $\delta^{13}C_1$ versus $\delta^{13}C_2$ is provided forthcoming.

In FIG. 2, method 200 includes step 015 optionally plotting a reference line on the chart where $\delta^{13}C_1 = \delta^{13}C_2$. In one or more embodiments, a reference line defined by the relationship $\delta^{13}C_1 = \delta^{13}C_2$ is plotted on the chart. The presence of the line may assist in the fabrication of the completed chart by determining a proper maturity limitation between those bounds of the second, third, and fourth maturity groups. As will be described further, the second, third, and fourth maturity shapes by definition are bound by the relationship $\delta^{13}C_1 = \delta^{13}C_2$; therefore, the reference line is merely a visual guide in fabricating the chart.

FIG. 3A shows a dashed reference line (110) plotted on chart 100 where the value of $\delta^{13}C_1$ is equal to the value of $\delta^{13}C_2$. In the area of the chart below reference line 110, $\delta^{13}C_1$ is greater than $\delta^{13}C_2$, indicating a more mature reservoir, that is, having a vitrinite reflectance equivalents value greater than 2.0%. Above the reference line 110, $\delta^{13}C_2$ is greater than $\delta^{13}C_1$, indicating a less mature reservoir, that is a vitrinite reflectance equivalents less than or equal to 2.0%.

As the reservoir matures, the relative value of $^{13}\delta C_1$ increases such that the dominant isotopic ratio concentration changes from $\delta^{13}C_1 < \delta^{13}C_2$ to $\delta^{13}C_1 > \delta^{13}C_2$. When that occurs, those of skill in the art consider the reservoir to be in a "reversed" isotopic phase. Such a change indicates a formation proceeding towards greater maturity as it progresses through the wet gas cracking phase. Therefore, the reference line 110 plays an important visual limitation in appreciating where along the maturity phase a reservoir or a portion thereof lies as it is being assessed.

Although not required in constructing the chart, in FIG. 3A the chart 100 roughly shows the clusters comprising the historical data points of the four different maturity groups. The four maturity groups are each based upon groupings or collections of one or more historical data points. Each data point has an associated vitrinite reflectance equivalents (VRE) value. Each of the four maturity groups has a range of VRE values so that the historical data point may be collectively classified. A first maturity group (130), where the VRE values are in a range of from greater than 0 to about 1.5% reflectance, designates a portion of the chart where both $\delta^{13}C_1$ and $\delta^{13}C_2$ appear to be rising in tandem and $\delta^{13}C_2 > \delta^{13}C_1$. The second maturity group (132), where the VRE values are in a range of from about 1.5% to 2.0% reflectance, designates the portion of the chart where it appears both $\delta^{13}C_1$ rises and $\delta^{13}C_2$ declines dramatically and simultaneously while $\delta^{13}C_1 \leq \delta^{13}C_2$. The third maturity group (134), where the VRE values are in a range of from about 2.0% to about 3.5% reflectance, designates the portion of the chart where it appears that $\delta^{13}C_1 > \delta^{13}C_2$ but total reversal has not yet appeared to have occurred. Finally, the fourth maturity group (136), where VRE values are in a range of from about 3.5% to 5.0% reflectance, designates the area of the chart where total reversal in isotopic ratios ($\delta^{13}C_3 < \delta^{13}C_2 < \delta^{13}C_1$) may have occurred. In examining the four groups, the first two groups (130, 132) appear positioned above the reference line 110; the latter two groups (134, 136) below the reference line 110.

In examining FIG. 3A for just the historical data of $\delta^{13}C_1$, $\delta^{13}C_2$, and VRE maturity groups, the "lazy Z" pattern formed by the historical data on the $\delta^{13}C_1$ versus $\delta^{13}C_2$ is appreciated. As an unconventional formation matures, the concentrations of $\delta^{13}C_1$ and $\delta^{13}C_2$ change dramatically relative to one another. The four maturity groups reflect regions in the chart where changes in isotopic ratios indicate maturation phases of the unconventional formation based upon vitrinite reflectance equivalents percentage.

In the first maturity group, where VRE values are in a range of from greater than 0 to about 1.5% reflectance, both concentrations of $\delta^{13}C_1$ and $\delta^{13}C_2$ tend to rise generally in tandem. This is considered the "normal" or "pre-desorption" maturity phase, such as would be found in a young unconventional formation. At the earlier part of the maturity phase, kerogen cracking dominates. Kerogen cracking mainly generates crude oil and condensate, but some gas products, especially methane, are produced, causing a rise in $C_1$. In the latter part of the phase, the heavier components of the crude oil are cracking, although kerogen still contributes to the lighter fluids generation process. This is typical of unconventional reservoirs as they pass into greater maturity: there is a mix or portfolio of sources of material to crack, although in a given phase there may be a dominant provider of cracked products.

In FIG. 2, method 200 includes step 020 where plotting a first maturity shape on the chart encompassing an area where a substantial number of the plotted historical data associated with the first maturity group are located. In one or more embodiments, a first maturity having an enclosed first boundary is plotted on the chart such that a substantial number of the historical data points having a VRE value in a range of from about 0.5 to 1.5% reflectance equivalents may be located within a first maturity area, where the first maturity area is defined by the first boundary of the first maturity shape.

Figure 3B:
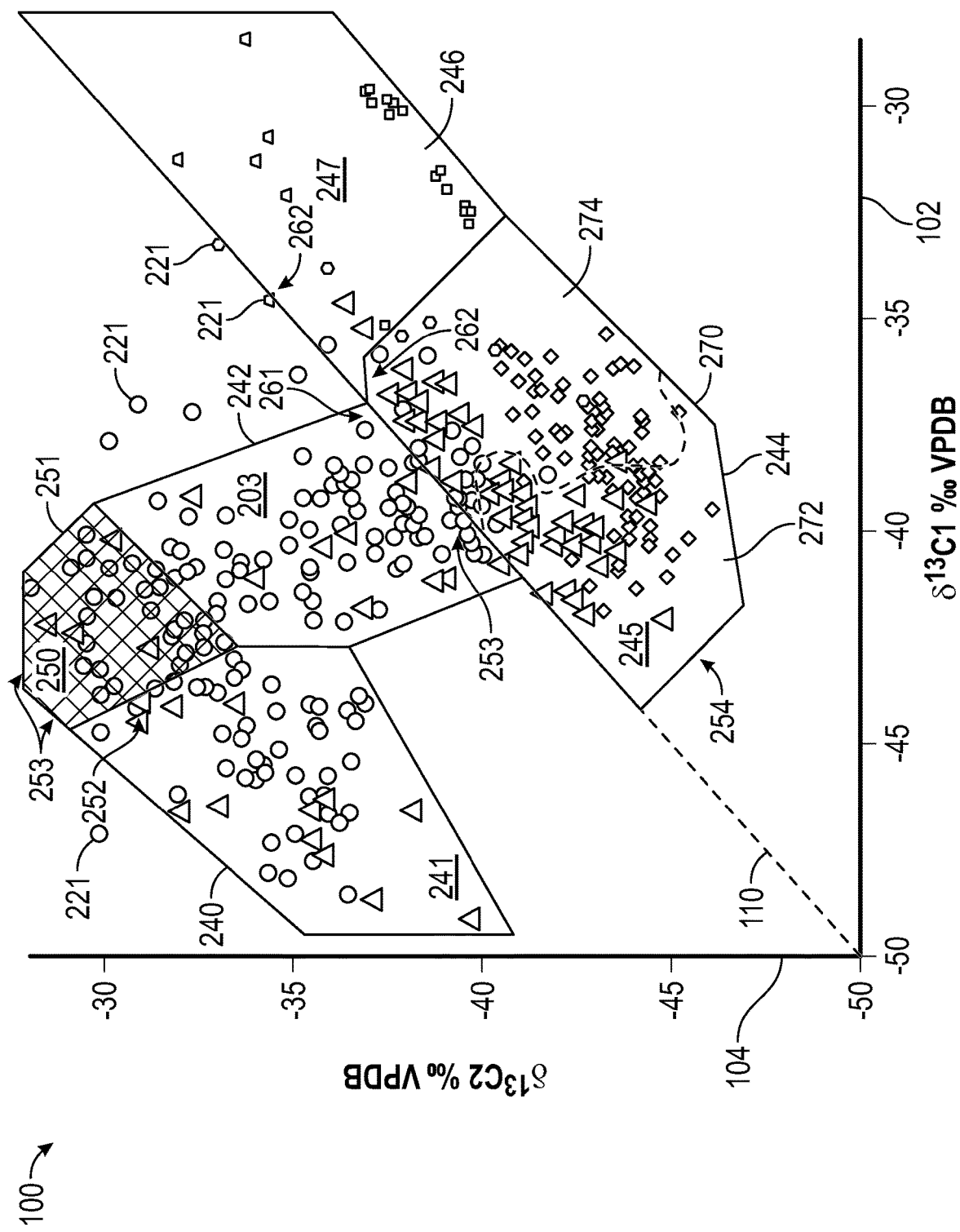
FIG. 3B is a plot of associated historical data points for $\delta^{13}C_1$ versus $\delta^{13}C_2$ values for several Paleozoic and pre-Paleozoic reservoirs with maturity shapes that group the historical data points according to VRE value into one of four maturities according to one or more embodiments.

FIG. 3B is a plot of associated historical data points for $\delta^{13}C_1$ versus $\delta^{13}C_2$ values for several Paleozoic and pre-Paleozoic reservoirs with maturity shapes that group the historical data points according to VRE value into one of four maturities, according to one or more embodiments.

A maturity shape is a designation of a given area on the chart that is associated with the plotted historical data points of a maturity group, that is, a given range of VRE values. The shape boundary of the plotted maturity shape forms an enclosed area—a shape area—on the chart where plotted data points are located. The shape boundary may surround a group of plotted historical data points reflective of the given range of VRE values such that the maturity shape represents a reasonable area of the chart around which historical and non-historical plotted data points having similar VRE values would be located.

As a prophetic example, a first maturity shape 240 in FIG. 3B represents a plotted area where a substantial number of the plotted historical data points 120 may be associated with VRE values in a range of from about 0.5 to 1.5% reflectance equivalents, such as those plotted historical data points 120 of first maturity group 130 of FIG. 3A, are located. The first maturity shape 240 has a first shape boundary 251 that defines the limits of the first maturity shape 240. As well, the first shape boundary 251 also defines an interior first shape area 241, where the first maturity group 130 plotted historical data points 120 are located.

In one or more embodiments, the shape boundary of a maturity shape, which represents a maturity phase, encloses a substantial number of the plotted historical data points for a given VRE value range—at least 50% and preferably more. For example, at least 80% of the plotted historical data points having a VRE value within the representative VRE value range for the maturity phase, such as about 85% or greater, or about 90% or greater, or about 95% or greater, or about 98% or greater, or about 99% or greater of the plotted historical data points, may be present in a maturity shape. For example, the number of plotted historical data points plotted within the bounds of a maturity shape may be in a range of from about 50% to 100% of the plotted historical data points for a given VRE value range. For example, in plotting first maturity shape 240 on chart 100 of FIG. 3B, all the plotted historical data points 120 associated with first maturity group 130 are bounded by the first shape boundary 251 of first maturity shape 240 except for one. In this instance, this represents about 98% or greater of the plotted historical data points having a VRE value in a range of from about 0.5 to 1.5% reflectance equivalents Outlier data point 221 is a plotted historical data point 120 that otherwise appears to conform to the VRE value range of the first maturity group 130; however, it is not included in the configuration of the first shape area 241. It is difficult to appreciate where within the maturity group it should reside (VRE closer to 0.5% or closer to 1.5% reflectance equivalents). In such an instance, retesting of the gas sample and potentially confirming with a vitrinite reflectance equivalents percentage analysis may remedy any potential human or sampling error for this data point and cause it to fit within the first shape area 241, or may require first shape area 241 to be reconfigured.

In plotting an enclosed shape around a group of plotted historical data set values, the enclosed shape may have a shape boundary with any given configuration as long as the shape is enclosed and has a definable shape area. In one or more embodiments, the enclosed shape can take the form of a regular geometric shape, such as an ellipse or a polygon, like a trapezoid or rectangle. In one or more embodiments, the enclosed shape can take the form of an irregular shape. For example, in FIG. 3B, first maturity shape 240 is in the form of a polygon that encloses most of the plotted historical points associated with first maturity group 130 in first shape boundary 251. First shape boundary has 8 straight yet irregular length flat surfaces at various internal angles.

As maturation continues through oil cracking and into wet gas cracking, the relative concentration relationship of $\delta^{13}C_1$ and $\delta^{13}C_2$ changes. As the maturation process transitions from cracking crude oil to wet hydrocarbon gases, the hydrocarbon gas becomes drier, that is, has a decreasing amount of $\delta C_{2+}$ components. In the second maturity phase, the relative concentration of $\delta^{13}C_2$ drops dramatically as the relative concentration of $\delta^{13}C_1$ continues to increase. This steep decline causes what appears to be a "rollover" in the chart. As well, the continued increase in methane isotopes shows that this is also an "initial desorption" phase. In this maturity phase, the $\delta^{13}C_1$ and $\delta^{13}C_2$ are not rising in concert anymore; the relative increase in $\delta^{13}C_1$ concentration causes the $\delta^{13}C_1$ value to catch up to and eventually equal the $\delta^{13}C_2$ value. In this maturity group, the change in VRE values is also small: VRE values are in a range of from about 1.5% to 2.0% reflectance equivalents.

Although not wanting to be bound by theory, it is believed that the difference in behavior of the second maturity phase is that the $\delta^{13}C_1$ becomes larger than the $\delta^{13}C_2$ and $\delta^{13}C_3$ after the point of "rollover". Crude oil and minor wet gas cracking near the transition from the first maturity phase to the second maturity phase generate significant quantities of $^{12}C_1$ over $^{13}C_1$ while also diluting the relative concentrations of $C_2$ and $C_3$. This is believed to be caused by the shift away from kerogen-generated hydrocarbons and towards crude oil-generated methane. However, as described previously there is still some kerogen cracking that does continue for the transition into the second maturity phase.

In FIG. 2, method 200 includes step 025 where plotting a second maturity shape on the chart encompassing an area where a substantial number of the plotted historical data associated with the second maturity group are located. In one or more embodiments, a second maturity having an enclosed second boundary is plotted on the chart such that a substantial number of the historical data points having a VRE value in a range of from about 1.5 to 2.0% reflectance equivalents may be located within a second maturity area, where the second maturity area is defined by the second boundary of the second maturity shape and where a lower portion of the second boundary is defined by the relationship $\delta^{13}C_1 = \delta^{13}C_2$.

A second maturity shape 242 in FIG. 3B represents a plotted area where a substantial number of the plotted historical data points 120 may be associated with VRE values in a range of from about 1.5 to 2.0% reflectance equivalents, such as those plotted historical data points 120 of second maturity group 132 of FIG. 3A, are located. The second maturity shape 242 has a second shape boundary 252 that defines the limits of the second maturity shape 242. As well, the second shape boundary 252 also defines an interior second shape area 243, where the second maturity group 132 plotted historical data points 120 are located.

The second shape boundary 252 has a slightly different configuration than the first shape boundary 251 previously described. The second shape boundary has several straight edges as the first shape boundary does. A significant number of the plotted historical data points 120 of second maturity group 132 are encompassed in second shape area 243.

There are several outlier data points 221, including a few proximate to the reference line 110, that otherwise would be in the second shape area 243; however, they are not included due to their relative $\delta^{13}C_1$ versus $\delta^{13}C_2$ values compared to the clustering within the interior second shape area 243. Some of these values may have testing or sampling errors associated with them due to their outlying positions, or may require second shape area 243 to be reconfigured to include them.

Concerning second maturity shape 242, the second shape boundary 252 has additional aspects that impact the configuration of the second shape area 243 not previously described. A lower portion 261 of second shape boundary 252 runs along reference line 110, where $\delta^{13}C_1=\delta^{13}C_2$. Near this boundary, the dominant form of gas generation is occurring from wet gas cracking; however, crude oil and kerogen are still somewhat contributing. It has been determined that when $\delta^{13}C_1>\delta^{13}C_2$, the historical data cannot reflect a sample within the second maturity range, that is, VRE is in a range of from about 1.5 to 2.0% reflectance equivalents. Therefore, part of the second maturity shape 242 has a fixed boundary demarcated by the $\delta^{13}C_1=\delta^{13}C_2$ relationship.

Another aspect of the second maturity shape is that in one or more embodiments the plotting of the second maturity shape and the plotting on the first maturity shape results in a shared, non-exclusive overlapping maturity area. Along with sharing several common shape borders 253, where both first shape boundary 251 and second shape boundary 252 are the same, in some instance there is also a shared, non-exclusive, overlapping portion of first shape area 241 and second shape area 243 where first maturity shape 240 and second maturity shape 242 overlap. This overlapping maturity area 250 has historical data points 120 that belong to both first maturity group 130 and second maturity group 132; however, the historical data points plotted on chart 100 are intimately intermingled such that the historical data points cannot be clearly separated using a chart demarcation tool, such as by a plotted line or a shared shape boundary 253. This is because the historical data is derived from similar yet different sources of reservoir information. For example, there may be minor differences in maturity development due to the age (Paleozoic, pre-Paleozoic) of the reservoir. There also may be differences in maturity development due to the types of matrix material (sandstone, shale). As well, geo-location of the reservoir and its thermal history may also play a role in the differences.

Although not wanting to be bound by theory, aggregating the historical data from different sources—times, types, locations, history—during the time of crude oil cracking appears to produce a general trend from the "normal" phase to the "rollover" phase; however, it may also contribute potentially to a lack of precision of determining where the first maturity group ends and the second maturity group begins. The tremendous increase in the $C_1$ pool during both periods may mask a number of differences that may cause the observed intermingling of data points. As well, the same type of transformation is occurring, where crude oil and light condensate is being cracked into wet gas and methane products.

As the relative concentration of $\delta^{13}C_1$ continues to increase in the third maturity phase, for a period the relative concentration of $\delta^{13}C_2$ may continue to decline; however, the relative concentration of $\delta^{13}C_2$ begins to recover as the $\delta^{13}C_2$ concentration decline eventually reverses itself. As the increase in relative concentration of $\delta^{13}C_2$ begins to reach parity with the increase of $\delta^{13}C_1$ concentration, the concentration relationship between $\delta^{13}C_1$ and $\delta^{13}C_2$ remains reversed from what it was previously, that is, $\delta^{13}C_1>\delta^{13}C_2$. "Significant desorption" is occurring during this phase of maturation. Wet gas cracking is the dominant metamorphosis occurring to the hydrocarbon portfolio, but there are also contributions from any remaining crude oil and kerogen cracking. In the third maturity group, the VRE values are in a range of from about 2.0% to about 3.5% reflectance equivalents.

Although not wanting to be bound by theory, when wet gas cracking occurs, besides the hydrocarbon gas becoming drier (that is, the decreasing concentration of $C_{2+s}$ and the increasing concentration of $C_1$), the isotopic ratios also change significantly. While $C_{2+s}$ (the wet gas component) are cracked, the remaining $\delta^{13}C_2$ and $\delta^{13}C_3$ values increase because $^{12}C_2$ and $^{12}C_3$ are preferably consumed before their associated $^{13}C$ isotopes.

In FIG. 2, method 200 includes step 030 where plotting a third maturity shape on the chart encompassing an area where a substantial number of the plotted historical data associated with the third maturity group are located. In one or more embodiments, a third maturity shape having an enclosed third boundary is plotted on the chart such that a substantial number of the historical data points having a VRE value in a range of from about 2.0 to about 3.5% reflectance equivalents may be located within a third maturity area, where the third maturity area is defined by the third boundary of the third maturity shape and where an upper portion of the third boundary is defined by the relationship $\delta^{13}C_1=\delta^{13}C_2$.

A third maturity shape 244 in FIG. 3B represents a plotted area where a substantial number of the plotted historical data points 120 may be associated with VRE values in a range of from about 2.0 to 3.5% reflectance equivalents, such as those plotted historical data points 120 of third maturity group 134 of FIG. 3A, are located. The third maturity shape 244 has a third shape boundary 254 that defines the limits of the third maturity shape 244. As well, the third shape boundary 254 also defines an interior third shape area 245, where the third maturity group 134 plotted historical data points 120 are located.

Concerning third maturity shape 244, the third shape boundary 254 has additional aspects that impact the configuration of the third shape area 245. An upper portion 262 of third shape boundary 254 runs along reference line 110, where $\delta^{13}C_1=\delta^{13}C_2$. It has been determined that when $\delta^{13}C_1<\delta^{13}C_2$, the historical data cannot reflect a sample within the third maturity range, that is, VRE is in a range of from about 2.0 to 3.5% reflectance equivalents. Therefore, part of the third maturity shape 244 has a fixed boundary demarcated by the $\delta^{13}C_1=\delta^{13}C_2$ relationship.

Although a point may fall on one side of the reference line 110 or the other, there is not much of a production decision change between one side of the line or the other when the points are proximate to one another. It is only when a data point is relatively removed from the reference line that a strategy for production and expected products may change from those that would be found in the lower portion of second maturity shape or the upper part of the third maturity shape.

In one or more embodiments, the boundaries for the second and third maturity shapes share a common boundary that is demarcated by the $\delta^{13}C_1=\delta^{13}C_2$ relationship. As seen in FIG. 3B, a portion of the second shape boundary 252 and a portion of the third shape boundary 254 are a shared shape boundary 253 along the reference line 110. Along this boundary 254 a significant amount of wet gas cracking is occurring. Although not wanting to be bound by theory, some appreciate unconventional formations having a $\delta^{13}C_1 \sim \delta^{13}C_2$ such that an amount of wet gas is present but little natural gas condensate is available to condense and interrupt production upon a decline in the pressure of the formation.

Not shown as part of FIG. 3A or 3B, the value of $\delta^{13}C_3$ in comparison to the $\delta^{13}C_1$ and $\delta^{13}C_2$ values in the third maturity phase may provide additional information regarding relative maturity. In the significant desorption phase, a first subgroup should have VRE values closer to 2.0 than 3.5% reflectance equivalents and should have an isotopic relationship of $\delta^{13}C_3 > \delta^{13}C_1 > \delta^{13}C_2$. Similarly, a second subgroup should have VRE values closer to 3.5 than 2.0% reflectance equivalents and an isotopic relationship of $\delta^{13}C_1 > \delta^{13}C_3 \geq \delta^{13}C_2$. Only a "partial reversal" of the isotopic relationship between $^{13}C_1$, $^{13}C_2$, and $^{13}C_3$ has occurred versus the relationship present in the first maturation phase ($\delta^{13}C_3 > \delta^{13}C_2 > \delta^{13}C_1$).

In FIG. 2, an optional step 035 is provided for method 200 where the third maturity area is further subdivided into two sub-areas. In one or more embodiment, an internal boundary is plotted on the chart within the third maturity shape such that the third maturity area is subdivided into a first subdivided area and a second subdivided area. As shown in FIG. 3B, third maturity shape 244 includes third shape interior barrier 270 (dashed line) that divides third shape area 245 into first subshape 272 and second subshape 274.

In one or more embodiments, the internal boundary is plotted within the third maturity shape such that a substantial number of the plotted historical data points having a VRE value in a range of from about 2.0 to about 3.0% reflectance equivalents are located within a first subdivided area and where a substantial number of the plotted historical data points having a VRE value in a range of from about 3.0 to about 3.5% reflectance equivalents are located within the second subdivided area. By doing such a subdivision of the third maturity shape, a more accurate determination of processing conditions for the reservoir from which the sample was obtained.

In one or more embodiments, the internal boundary is plotted within the third maturity shape such that at a substantial number of the plotted historical points having an isotopic relationship of $\delta^{13}C_3 > \delta^{13}C_1 > \delta^{13}C_2$ may be located within the first subdivided area and where a substantial number of the plotted historical data points having an isotopic relationship of $\delta^{13}C_1 > \delta^{13}C_3 > \delta^{13}C_2$ may be located within the second subdivided area. It has been determined that when $\delta^{13}C_3 > \delta^{13}C_1 > \delta^{13}C_2$, a significant portion of the Paleozoic and pre-Paleozoic samples have an associated $VR_O$ value that may be in a range of from about 2.0 to 3.0% reflectance equivalents. Where the isotopic relationship of $\delta^{13}C_1 > \delta^{13}C_3 \geq \delta^{13}C_2$ exists, a significant portion of the samples have an associated $VR_O$ value that may be in a range of about 3.0 to 3.5% reflectance equivalents. Although there may be some instances where these relationships may not hold true, it is believed that in a significant portion of the samples taken with these gas ratio relationship would fall respectively into the IIIa and IIIb zones and have a VRE value less than 3.5% reflectance equivalents.

At VRE values greater than 3.5% reflectance equivalents, which is considered the fourth maturation group, the hydrocarbon stock being cracked is considered residual kerogen and any remaining wet gases. At this "deep desorption" portion of maturity, the reversed relationship between $\delta^{13}C_1$ and $\delta^{13}C_2$ is maintained, that is, $\delta^{13}C_1 > \delta^{13}C_2$. Most of the existing wet gas has been cracked; only kerogen residuals and any wet gas is quickly cracked into dry gas (and isotopes).

During the fourth maturity phase, "total reversal" of the isotopic relationship occurs, that is, $\delta^{13}C_3 < \delta^{13}C_2 < \delta^{13}C_1$. By this point in the maturation process, most of the material in the unconventional formation is dry gas (that is, methane), water, and residual kerogen. In fact, in mature unconventional fields, there may be very little ethane or propane left (let alone isotopes thereof). Although not wanting to be bound by theory, in such mature unconventional fields water may react with residual kerogen and form light hydrocarbon gases—$C_1$, $C_2$, and $C_3$—along with carbon dioxide. With time, the "newer" wet gas is converted into $C_1$. Such a reaction would cause a decline in $\delta^{13}C_1$, but this would only occur in the most advanced formations. At the greater VRE values, methane may begin to decompose into hydrogen and carbon and other gases, such as carbon oxides (CO and CO2).

In FIG. 2, method 200 includes step 040 plotting a fourth maturity shape on the chart encompassing an area where a substantial number of the plotted historical data associated with the fourth maturity group are located. In one or more embodiments, a fourth maturity shape having an enclosed fourth boundary is plotted on the chart such that a substantial number of the historical data points having a VRE value in a range of from about 3.5 to 5.0% reflectance equivalents may be located within a fourth maturity area, where the fourth maturity area is defined by the fourth boundary of the fourth maturity shape and where an upper portion of the fourth boundary is defined by the relationship $\delta^{13}C_1 = \delta^{13}C_2$.

A fourth maturity shape 246 in FIG. 3B represents a plotted area where a substantial number of the plotted historical data points 120 may be associated with VRE values in a range of from about 3.5 to 5.0% reflectance equivalents, such as those plotted historical data points 120 of fourth maturity group 136 of FIG. 3A, are located. The fourth maturity shape 246 has a fourth shape boundary 256 that defines the limits of the fourth maturity shape 246. As well, the fourth shape boundary 256 also defines an interior fourth shape area 247, where the fourth maturity group 136 plotted historical data points 120 are located.

Concerning fourth maturity shape 246, the fourth shape boundary 256 has additional aspects that impact the configuration of the fourth shape area 247. An upper portion 262 of fourth shape boundary 256 runs along reference line 110, where $\delta^{13}C_1 = \delta^{13}C_2$. It has been determined that when $\delta^{13}C_1 < \delta^{13}C_2$, the historical data should not reflect a sample within the fourth maturity range, that is, VRE having a range of from about 3.5 to 5.0% reflectance. Therefore, part of the fourth maturity shape 246 may be associated with the fixed relationship demarcated by $\delta^{13}C_1 = \delta^{13}C_2$.

In one or more embodiments, the boundaries for the second and fourth maturity shapes share a common boundary that is demarcated by the $\delta^{13}C_1 = \delta^{13}C_2$ relationship. As seen in FIG. 3B, a portion of the second shape boundary 252 and a portion of the fourth shape boundary 256 are a shared shape boundary 253 along the reference line 110.

In one or more embodiments, at least a majority of the historical data points having an isotopic relationship of $\delta^{13}C_1 > \delta^{13}C_2 > \delta^{13}C_3$ are located within the fourth maturity area. It has been determined that when $\delta^{13}C_1>\delta^{13}C_2>\delta^{13}C_3$, most, if not all, of the Paleozoic and pre-Paleozoic samples have a VRE value is a range of from about 3.5 to 5.0% reflectance equivalents. Although there may be some instances where this relationship does not hold, it is believed that in a significant portion of the samples taken with this gas ratio relationship would have a VRE value at or greater than 3.5% reflectance equivalents.

With the inclusion of all four maturity shapes in the chart, the unconventional reservoir maturity chart is complete and ready for use. Although not shown as part of the overall method, it is understood by a person of ordinary skill in the art that at any time new historical data points may be added to the chart. In doing so, the maturity shape boundaries may need to be revised, as necessary, to reflect a broader understanding of the relationship of $\delta^{13}C_1$ to $\delta^{13}C_2$ for Paleozoic and pre-Paleozoic sandstone and shale unconventional reservoirs.

Optionally, step 045 in method 200 includes removing the optionally plotted reference line defined by the relationship $\delta^{13}C_1=\delta^{13}C_2$ from the chart. As well, step 045 in method 200 may also include removing the plotted historical data points from the chart. As this point in the process, the four maturity shapes are plotted as shown in FIG. 3B. The guide that the plotted reference line provides and the classification of the historical data points are no longer required. However, either or both may be retained if so desired.

Figure 4:
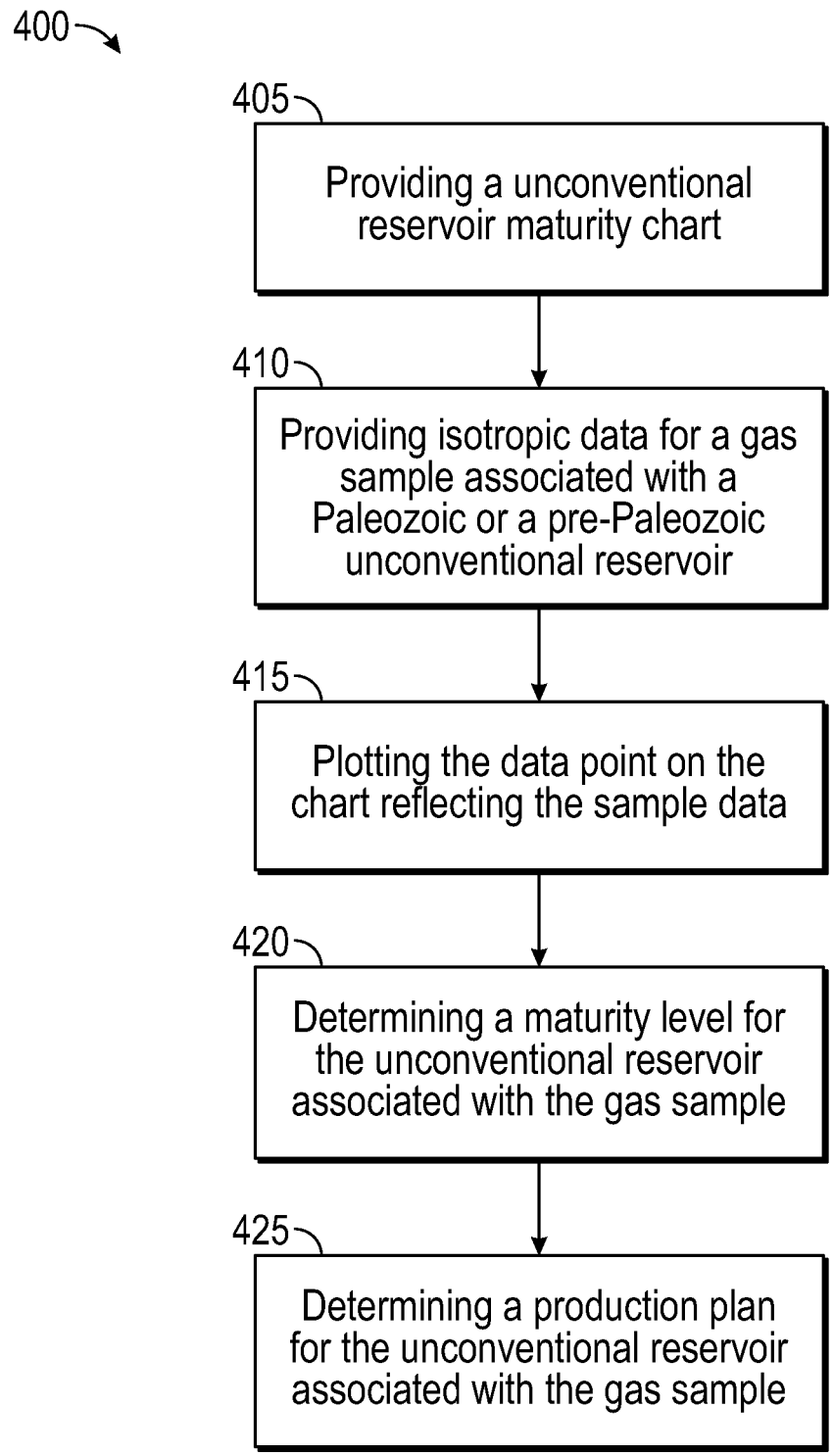
FIG. 4 is a flowchart that illustrates a method of utilizing an unconventional reservoir maturity chart in accordance with one or more embodiments.

FIG. 4 is a flowchart that illustrates a method of utilizing an unconventional reservoir maturity chart in accordance with one or more embodiments. In a method of using an unconventional reservoir maturity chart, a chart is provided in one or more embodiments. In method 400 of FIG. 4, step 405 shows providing an unconventional reservoir maturity chart.

Figure 5:
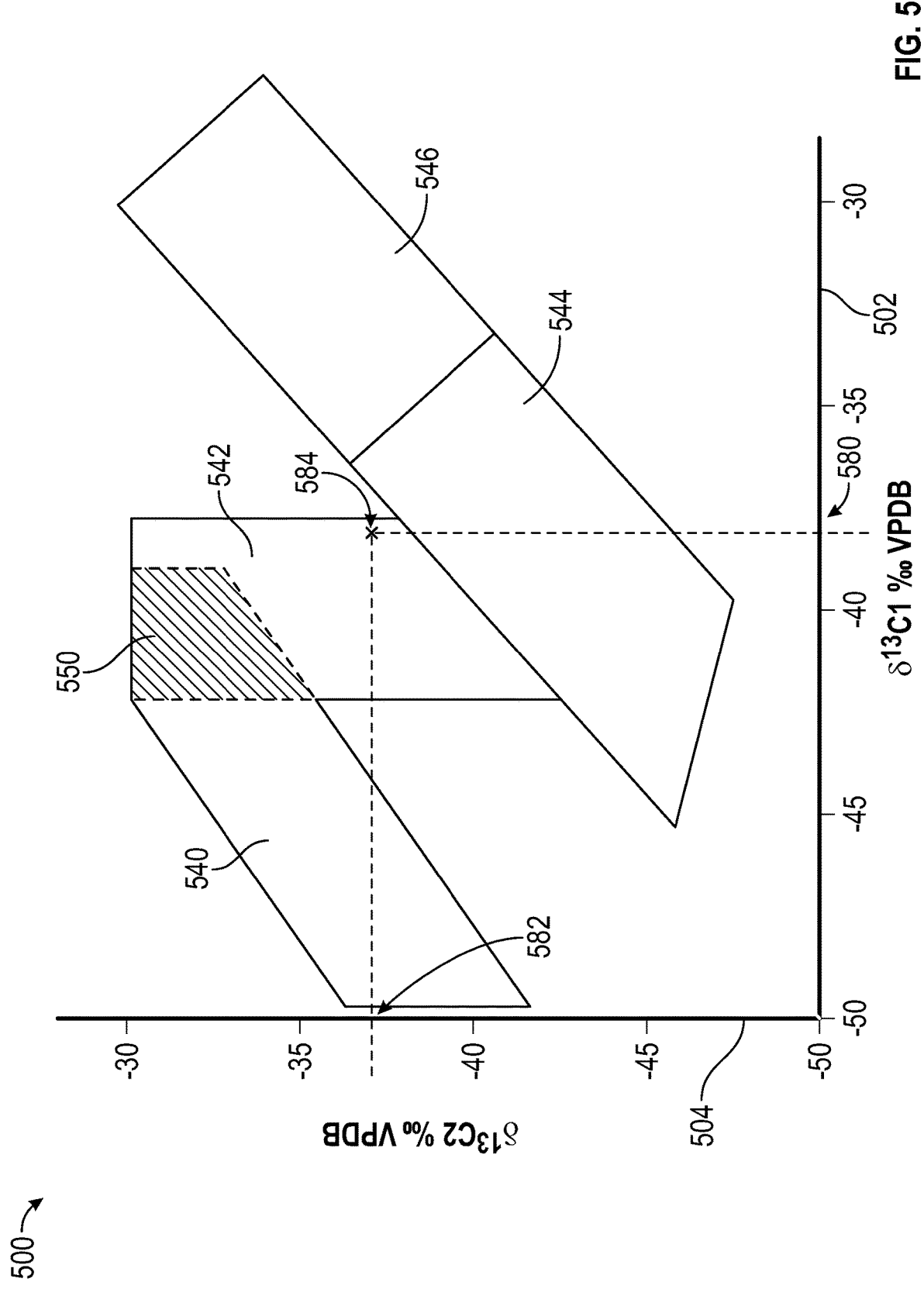
FIG. 5 is a plot of four maturity shapes (Maturity I, II, III, and IV) associated with historical data of $\delta^{13}C_1$ versus $\delta^{13}C_2$ for at least one Paleozoic and pre-Paleozoic reservoir according to one or more embodiments.

FIG. 5 is a plot of four maturity shapes (Maturity I, II, III, and IV) associated with historical data of $\delta^{13}C_1$ versus $\delta^{13}C_2$ for at least one Paleozoic and pre-Paleozoic reservoir according to one or more embodiments. As seen in FIG. 5, an unconventional reservoir maturity chart 500 is provided for use by a person of skill in the art. FIG. 5 is a prophetic but realistic example of a potential maturity chart for utilization. An unconventional reservoir maturity chart includes several maturity areas associated with at least one set of historical data. The historical data is associated with previously analyzed gas samples from at least one Paleozoic and pre-Paleozoic sandstone or shale unconventional reservoir, as previously described.

Chart 500 of FIG. 5 has similar features to chart 100 of FIG. 3A or 3B, but there are also material differences. Chart 500 is shown with four maturity shapes: first maturity shape 540 ("Maturity I"), second maturity shape 542 ("Maturity II"), third maturity shape 544 ("Maturity III"), and fourth maturity shape 546 ("Maturity IV"). The first and second maturity shapes 540, 542 share an overlapping shape area 550 ("I/II"). No historical data points or reference lines are provided; however, it is apparent from the configuration of several of the maturity shapes that the relationship $\delta^{13}C_1=\delta^{13}C_2$ defines in part the areas of the second, third, and fourth maturity shapes 542, 544, and 546, respectively.

Third maturity shape 544 is not shown as being subdivided in FIG. 5. In one or more embodiments, the provided unconventional reservoir maturity chart has a third maturity group that is divided into a first and a second maturity subgroup, as previously described. In one or more embodiments, the division between the first and second maturity subgroup is based upon isotopic ratios of $\delta^{13}C_1$ to $\delta^{13}C_2$ to $\delta^{13}C_3$, as previously described. In one or more embodiments, the division between the first and second maturity subgroup is based upon vitrinite reflectance equivalents (VRE) values, as previously described.

In step 410 of method 400 of FIG. 4, isotopic data is provided for a gas sample associated with a Paleozoic or a pre-Paleozoic unconventional reservoir. In one or more embodiments, the values for $\delta^{13}C_1$ and $\delta^{13}C_2$ are provided for a hydrocarbon gas sample associated with a Paleozoic or pre-Paleozoic sandstone or shale unconventional reservoir for which the maturity level is to be determined. In one or more embodiments, the values are provided by performing a compositional and isotopic analysis on a gas sample from the reservoir. In one or more embodiments, the gas sample is obtained from a Paleozoic and pre-Paleozoic sandstone and shale unconventional reservoir. The gas sample may be obtained during exploration or production of a reservoir. The gas sample may be obtained during any portion of the production life of the reservoir such that the maturity level of the reservoir may be updated, for example, while relative isotopic values shift during prolonged wet gas production from a reservoir.

In one or more embodiments, the value for $\delta^{13}C_3$ is also provided and associated with the reservoir for which the maturity level is to be determined. Although such information may not be used directly with chart 400 of FIG. 4, such information may be used to refine and develop additional analysis charts in associating $\delta^{13}C_3$ value with maturity.

In one or more embodiments, the value for VRE is also provided and associated with the reservoir. Specifically, this value is not required for utilization of method 400; however, the data may be obtained along with analysis of the gas sample or may be provided to later verify the result determined utilizing the unconventional reservoir maturity chart.

In FIG. 4, step 415 includes plotting the data point on the chart reflecting the sample data. In one or more embodiments, a data point having the values of $\delta^{13}C_1$ and $\delta^{13}C_2$ associated with the gas sample is plotted on the unconventional reservoir maturity chart.

As shown in FIG. 5, a gas sample has a sample $\delta^{13}C_1$ value 580 that is shown along x-axis 502 and a sample $\delta^{13}C_2$ value 582 that is shown along y-axis 504. The sample data point 584 associated with the gas sample is the intersection within the chart 500 where the values 580, 582 intersect.

In FIG. 4, step 420 includes determining a maturity level for the unconventional reservoir associated with the gas sample. In one or more embodiments, a maturity level is determined based upon the position of the data point relative to the positions of the maturity shapes in the unconventional reservoir maturity chart. If the data point is within the boundary of a maturity shape, then the maturity level is the one for the shape that the data point is within. If the data point is outside the boundaries of the maturity shapes, then additional assessment, such as, but not limited to, the relative proximity to a maturity shape versus other maturity shapes; the associated $\delta^{13}C_3$ value of the gas sample, whether a determination that an association of a data point would violate the $\delta^{13}C_1=\delta^{13}C_2$ reference boundary, and the isotopic ratios of $\delta^{13}C_1$ to $\delta^{13}C_2$ to $\delta^{13}C_3$, may be necessary to determine the maturity level of the gas sample.

For example, in FIG. 5 sample data point 584 is within the boundary of second maturity shape 542. According to the chart provided (chart 500), this is falls within the "Maturity II" zone and outside of the mutually shared area (550). Therefore, the maturity of the unconventional reservoir from which the gas sample derived may be in a VRE value range of from about 1.5 to 2.0% reflectance equivalents. Visually observing the position of sample data point 584, it appears that the value of VRE is relatively close to the $\delta^{13}C_1=\delta^{13}C_2$ boundary; therefore, the estimated VRE value may be closer to 2.0% than 1.5% reflectance equivalents.

In FIG. 4, step 425 includes determining a production plan for the unconventional reservoir associated with the gas sample. In one or more embodiments, a production plan is determined based upon the maturity level for the reservoir.

A "wet" gas is a natural gas that contains a portion of the natural gas component that is not methane. For the purposes of this application, the degree of "wetness" when describing a hydrocarbon gas composition (for example, unconventional or associated) is often expressed utilizing the formula given in Equation 2:

Wetness=100%×$(C_2+C_3+C_4+C_5)/(C_1+C_2+C_3+C_4+C_5)$ (Equation 2)

where each of $C_{1-5}$ represents the fractional component of each hydrocarbon in the hydrocarbon gas. The "wetter" a natural gas, the greater amount of potentially condensable components exist in the gas. Such gas may have significant value for chemical processing after recovery; however, it may also provide certain difficulties in initial production and handling of the gas.

A Maturity I region is where VRE is a range of from about 0.5 to 1.5% reflectance equivalents. Near the left side of the maturity shape, which corresponds to an immature unconventional formation, the composition of the fluids are likely to comprise heavier crude oils with some associated wet gas. Closer to the right or shared area, the composition of fluids are likely to transition to medium crude, light crude, and even to natural gas condensate liquids as well as with greater amounts of wet gas than those hydrocarbons on the left side of the shape. Although there may not be too much difference in production and handling given the dominance of liquids, the amount of wet gas intermingled with the liquids may provide certain production challenges that are more likely to be present in a reservoir approaching ~1.5% vitrinite reflectance equivalents than those reservoirs that are less mature. At Maturity I, the expected wetness of the gas may be in a range of from about 7% to about 30%. Liquid production dominates throughout the maturity level; however, there is a significant amount of associated wet gas produced along with the liquid. Therefore, facilities useful for extracting, handling, separating, and purifying extracted liquids along with potential amounts of evolving gas are likely to be used in completions and production.

A Maturity II region is where VRE is a range of from about 1.5 to 2.0% reflectance equivalents. In the upper part of the Maturity II region, any potential production issues are similar to those as found in the more mature portion of the Maturity I: high API liquids, such as light crude oils and condensate, with wet gas. In Maturity II, as the assessed maturity value transitions from the upper portion of the shape to the boundary where be $\delta^{13}C_1=\delta^{13}C_2$ is located, the production fluids are likely dominated by wet gas and condensable liquids, such as liquids that condense in the wellbore due to decreasing head pressure. Produced liquids will be valued for its paraffinic alkane content. The wet gas still contains some heavy gas compounds. This area of the shape is considered to be near the best portion for unconventional gas production because of the combination of high-value light condensable liquids and gases. At this level of maturity, the expected level of wetness of the gas present in Maturity II is in a range of from about 2% to about 7%. Because of the dominance of gas production near the $\delta^{13}C_1=\delta^{13}C_2$ boundary, much of the equipment and production design may be towards gas processing with some liquids handling or even active mitigation. Therefore, facilities useful for extracting, handling, separating, and purifying extracted gases along and possibly handling some amounts of condensate (as the pressure of production decreases), such as performing fracking or having means for removing liquids from the production wellbore, are likely to be used in completions and production.

If the level is determined to be in Maturity III, careful observation of where the production level lies along the third maturity shape may reveal whether the reservoir is in the "sweet spot" for production of unconventional gas or closer to over-mature. Closer to the boundary of $\delta^{13}C_1\sim\delta^{13}C_2$ towards the left side of the Maturity III zone is where the unconventional gas begins to fully dry out, that is, most of the non-methane gases are converted to methane. The further the isotopic ratios get from the $\delta^{13}C_1=\delta^{13}C_2$ demarcation line, the more the gas dries out. Wetness in the lower left part of Maturity III is likely in a range of from about 1% to about 2%. Methane throughout Maturity III is the super-dominant gas component, and gas generally dominates production. Any liquids and solids remaining in the reservoir will continue to be cracked into wet gas and then into methane as the maturation process continues. Therefore, facilities useful for extracting, handling, separating, and purifying extracted gases, such as performing fracking or having refrigeration or pressure-swing absorption molecular separation systems, are likely to be used in completions and production.

If an unconventional Paleozoic or a pre-Paleozoic unconventional sandstone or shale reservoir is determined to have a Maturity IIIa, the VRE is a range of from about 2.0 to 3.0% reflectance equivalents. In regards to the expected isotopic ratios, in Maturity level IIIa the isotopic ratios should have a relationship of $\delta^{13}C_3>\delta^{13}C_1\geq\delta^{13}C_2$. If an unconventional Paleozoic or a pre-Paleozoic unconventional sandstone or shale reservoir is determined to have a Maturity IIIb, the VRE is a range of from about 3.0 to 3.5% reflectance equivalents. In regard to the expected isotopic ratios, in Maturity level IIIb the isotopic ratios should have a relationship of $\delta^{13}C_1>\delta^{13}C_3\geq\delta^{13}C_2$. Maturity IIIa unconventional reservoirs are not as mature as Maturity IIIb reservoirs, and are therefore more desirable as they are likely at their peak gas production from any remaining liquids and solids. As the reservoir maturity approaches the boundary between Maturity IIIb and IV, the reservoir likely shows signs of being over its production peak.

A reservoir found to have an isotope concentration combination of Maturity IV, the reservoir should have a VRE in a range of from about 3.5 to 5.0% reflectance equivalents. Such an unconventional reservoir may have already seen its best gas production days in the past according to many historical indications. After complete isotopic reversal, dry gas dominates at the Maturity III/IV boundary. As the maturity continues to increase through Maturity IV, the methane in the dry gas may begin to decompose, producing large amounts of soluble and mobile hydrogen. Still, such a reservoir may have some value in producing dry methane and hydrogen gases, which may be separable in special facilities for heating and refinery gases and for capturing hydrogen, respectively. Productive levels of noble gases, carbon monoxide and dioxide, hydrogen sulfide, and nitrogen, among other gaseous compounds, may also be provided, which are all useful in various chemical processes, such as enhanced oil recovery. The heating value may conform closely to that of mixtures of methane and non-HC gases (including N2, CO2 and inert gases). Gas dominates production; therefore, facilities useful for extracting, handling, separating, and purifying extracted gases, such as performing fracking or having refrigeration or pressure-swing absorption molecular separation systems, are likely to be used in completions and production.

Previously for the prophetic example, the determination that the sample gas appears to have been provided from a Maturity II unconventional reservoir. According to its ratio values for $\delta^{13}C_1$ and $\delta^{13}C_2$, the position of the plotted data point is above yet close to the $\delta^{13}C_1=\delta^{13}C_2$ demarcation line. The expected VRE value for this gas sample may reasonably be interpreted to be in the range of from about 1.5 to 2.0% reflectance equivalents, but closer to a 2.0% reflectance equivalents value than a 1.5% reflectance equivalents value. A prophetic gas sample generating such values (both isotopic ratios and VRE) may reasonably be associated with an unconventional formation that may produce a little bit of light condensate liquids at reduced pressures but mostly dry gas with a little wetness. That is, the hydrocarbon gas may have some concentrations of $C_{2+s}$ (that is, ethane, propane, butanes) along with some water, but nothing that is unreasonable to handle. Such an unconventional reservoir is close to peak gas production. This may indicate to a person of ordinary skill in the art in the production arts for unconventional reservoirs that physical surface facilities that may mitigate or separate out any ultra-light hydrocarbon liquids and water at surface conditions should be planned as well as downstream facilities that may fractionate some of the light gas components from the methane, if development and production of this reservoir occurs. This is quite a different planning forecast than if the reservoir was significantly less or more mature.

An optional step in the method may include updating the unconventional reservoir maturity chart utilizing the data provided by analysis of the gas sample and the unconventional reservoir. The isotopic data for the gas sample along with later determined vitrinite reflectance equivalents percentage for the unconventional reservoir may indicate that the unconventional reservoir maturity chart may require adjustment to one of its maturity shapes. In such an instance, both planning and laboratory personnel may work together to redefine the affected maturity zone in question and field information to make any necessary modifications to the unconventional reservoir maturity chart. As well, new historical information that conforms to the requirement of Paleozoic and pre-Paleozoic sandstone or shale unconventional formation type may also be interpreted to modify the chart configuration.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

"Optionally" and all grammatical variations thereof as used refers to a subsequently described event or circumstance that may or may not occur. The description includes instances where the event or circumstance occurs and instances where it does not occur.

The terms "substantial", "substantially", and all grammatical variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed is:

1. A method for determining a maturity level of a hydrocarbon gas of an unconventional reservoir, the method comprising:
analyzing a plurality of samples from at least one Paleozoic or pre-Paleozoic shale or sandstone reservoir to obtain a historical dataset comprising historical data points,
where the historical dataset provides carbon isotopic ratio values $\delta^{13}C_1$ and $\delta^{13}C_2$ and vitrinite reflectance equivalents (VRE) value of the analysed plurality of samples, and
wherein the plurality of samples comprise hydrocarbon gas samples, formation samples, or combinations thereof;
fabricating an unconventional reservoir maturity chart by:
plotting the $\delta^{13}C_1$ versus $\delta^{13}C_2$ included the historical dataset to obtain a $\delta^{13}C_1$ versus $\delta^{13}C_2$ plot, $\delta^{13}C_1$ and $\delta^{13}C_2$ are in units of parts per thousand (‰) Vienna Pee Dee Belemnite (VPDB);
plotting a first maturity shape having an enclosed first boundary on the $\delta^{13}C_1$ versus $\delta^{13}C_2$ plot such that a substantial number of the historical data points having a VRE value in a range of from about 0.5% to 1.5% reflectance equivalents are located within a first maturity area, where the first maturity area is defined by the first boundary of the first maturity shape;
plotting a second maturity shape having an enclosed second boundary on the $\delta^{13}C_1$ versus $\delta^{13}C_2$ plot such that a substantial number of the historical data points having a VRE value in a range of from about 1.5% to 2.0% reflectance equivalents are located within a second maturity area, where the second maturity area is defined by the second boundary of the second maturity shape and where a lower portion of the second boundary is defined by the relationship $\delta^{13}C_1=\delta^{13}C_2$;
plotting a third maturity shape having an enclosed third boundary on the $\delta^{13}C_1$ versus $\delta^{13}C_2$ plot such that a substantial number of the historical data points having a VRE value in a range of from about 2.0% to about 3.5% reflectance equivalents are located within a third maturity area, where the third maturity area is defined by the third boundary of the third maturity shape and where an upper portion of the third boundary is defined by the relationship $\delta^{13}C_1=\delta^{13}C_2$; and
plotting a fourth maturity shape having an enclosed fourth boundary on the $\delta^{13}C_1$ versus $\delta^{13}C_2$ plot such that a substantial number of the historical data points having a VRE value in a range of from about 3.5% to 5.0% reflectance equivalents are located within a fourth maturity area, where the fourth maturity area is defined by the fourth boundary of the fourth maturity shape and where an upper portion of the fourth boundary is defined by the relationship $\delta^{13}C_1=\delta^{13}C_2$;
performing compositional and isotropic analyses on the hydrocarbon gas of the unconventional reservoir which the maturity level is to be determined to obtain carbon isotopic ratio values $\delta^{13}C_1$ and $\delta^{13}C_2$ of the hydrocarbon gas;
plotting a data point on the unconventional reservoir maturity chart from the $\delta^{13}C_1$ and the $\delta^{13}C_2$ of the hydrocarbon gas; and
determining the maturity level of the hydrocarbon gas of the unconventional reservoir by determining a position of the data point relative to positions of the first maturity shape, the second maturity shape, the third maturity shape and the fourth maturity shape.

2. The method of claim 1, the method further comprising plotting a reference line on the unconventional reservoir maturity chart defined by the relationship $\delta^{13}C_1=\delta^{13}C_2$.

3. The method of claim 1 where the plotting of the first and second maturity shapes results in an overlapping maturity area shared between the first shape area and the second shape area.

4. The method of claim 1 where the plotting of the second maturity shapes results in a substantial number of the historical data points within the second maturity area having an isotopic ratio of $\delta^{13}C_2 \geq \delta^{13}C_1$ and not $\delta^{13}C_1 \geq \delta^{13}C_2$.

5. The method of claim 1 where the historical dataset provides compositional, isotope, and vitrinite reflectance data from the analyzed samples such that associated values of $\delta^{13}C_3$ are obtained.

6. The method of claim 5 where the plotting of the third maturity shapes results in a substantial number of the historical data points within the third maturity area having an isotopic ratio of either $\delta^{13}C_3 > \delta^{13}C_1 \geq \delta^{13}C_2$ or $\delta^{13}C_1 > \delta^{13}C_3 \geq \delta^{13}C_2$ but not either $\delta^{13}C_1 > \delta^{13}C_2 > \delta^{13}C_3$ or $\delta^{13}C_2 \geq \delta^{13}C_1$.

7. The method of claim 6, the method further comprising plotting an internal boundary on the unconventional reservoir maturity chart within the third maturity shape such that the third maturity area is subdivided into a first subdivided area and a second subdivided area.

8. The method of claim 7 where the plotting of the internal boundary results in both a substantial number of the historical data points within the first subdivided area having a VRE value in a range of from about 2.0% to about 3.0% reflectance equivalents and a substantial number of the historical data points within the second subdivided area having a VRE value in a range of from about 3.0% to 3.5% reflectance equivalents.

9. The method of claim 7 where the plotting of the internal boundary results in both a substantial number of the historical data points within the first subdivided area having an isotopic ratio of $\delta^{13}C_3 > \delta^{13}C_1 \geq \delta^{13}C_2$ and where a substantial number of the historical data points within the second subdivided area having an isotopic ratio of $\delta^{13}C_1 > \delta^{13}C_3 \geq \delta^{13}C_2$.

10. The method of claim 5 where the plotting of the third maturity shapes results in a substantial number of the historical data points within the fourth maturity area also having an isotopic ratio of $\delta^{13}C_1 > \delta^{13}C_2 > \delta^{13}C_3$.

11. The method of claim 1, further comprising providing a carbon isotopic ratio value of $\delta^{13}C_3$ for the hydrocarbon gas.

12. The method of claim 1, further comprising providing a vitrinite reflectance equivalents (VRE) value for the unconventional reservoir associated with the hydrocarbon gas.

13. The method of claim 1, further comprising determining a production plan for the unconventional reservoir associated with the determined maturity level of the hydrocarbon gas.

* * * * *